United States Patent
Wang et al.

(10) Patent No.: US 10,980,054 B2
(45) Date of Patent: *Apr. 13, 2021

(54) SYSTEM AND METHOD FOR SUPPORTING INTER-BAND CARRIER AGGREGATION WITH DIFFERENT UL/DL TDD CONFIGURATIONS

(71) Applicant: BlackBerry Limited, Waterloo (CA)

(72) Inventors: Yiping Wang, Allen, TX (US); Jun Li, Richardson, TX (US); Youn Hyoung Heo, San Jose, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,767

(22) Filed: Oct. 9, 2019

(65) Prior Publication Data

US 2020/0112979 A1    Apr. 9, 2020

Related U.S. Application Data

(63) Continuation of application No. 15/970,576, filed on May 3, 2018, now Pat. No. 10,536,964, which is a
(Continued)

(51) Int. Cl.
*H04W 72/12* (2009.01)
*H04W 72/04* (2009.01)
(Continued)

(52) U.S. Cl.
CPC ........... *H04W 72/1289* (2013.01); *H04J 3/16* (2013.01); *H04L 1/1671* (2013.01);
(Continued)

(58) Field of Classification Search
CPC .............. H04W 72/1289; H04W 72/04; H04L 1/1861; H04L 1/1854; H04L 1/1671;
(Continued)

(56) References Cited

U.S. PATENT DOCUMENTS

| 2009/0073932 A1 | 3/2009 | McBeath et al. |
| 2009/0109914 A1 | 4/2009 | McBeath et al. |

(Continued)

FOREIGN PATENT DOCUMENTS

| EP | 0911290 | 4/1999 |
| WO | 2007/145492 | 12/2007 |

(Continued)

OTHER PUBLICATIONS

Alcatel-Lucent, Alcatel-Lucent Shanghai Bell; "Next Steps for Study on Provision of Low-Cost MTC Ues"; Draft Report of 3GPP TSG RAN WG1 #67 v0.1.0, R1-114068; San Francisco, CA, USA , Nov. 14-18, 2011; 2 pages.

(Continued)

*Primary Examiner* — Habte Mered
(74) *Attorney, Agent, or Firm* — Fish & Richardson P.C.

(57) ABSTRACT

In some implementations, a method of wireless communications between a wireless communications network and wireless user equipment includes receiving, using a primary Time Division Duplex (TDD) configuration, data on a primary component carrier in a first frequency band. Using a secondary TDD configuration, data on a secondary component carrier is received in a second frequency band different from the first frequency band. A Hybrid Automatic Repeat Request (HARQ) for data received on the secondary component carrier is transmitted using a supplemental TDD configuration. A transmission or retransmission on the secondary component carrier uses a supplemental TDD configuration as well. The supplemental TDD configuration is different from the secondary TDD configuration. Furthermore, an uplink supplemental configuration may be different from a downlink supplemental configuration.

20 Claims, 11 Drawing Sheets

Related U.S. Application Data continuation of application No. 14/928,127, filed on Oct. 30, 2015, now Pat. No. 9,992,794, which is a continuation of application No. 13/360,625, filed on Jan. 27, 2012, now Pat. No. 9,203,559.

(51) Int. Cl.
| | |
|---|---|
| *H04J 3/16* | (2006.01) |
| *H04L 1/16* | (2006.01) |
| *H04L 1/18* | (2006.01) |
| *H04L 5/00* | (2006.01) |
| *H04L 5/14* | (2006.01) |

(52) U.S. Cl.
CPC .......... *H04L 1/1854* (2013.01); *H04L 1/1861* (2013.01); *H04L 5/001* (2013.01); *H04L 5/0055* (2013.01); *H04L 5/1469* (2013.01); *H04W 72/04* (2013.01)

(58) Field of Classification Search
CPC ..... H04L 5/1469; H04L 5/0055; H04L 5/001; H04J 3/16
See application file for complete search history.

(56) References Cited

U.S. PATENT DOCUMENTS

| | | | |
|---|---|---|---|
| 2009/0122758 | A1 | 5/2009 | Smith et al. |
| 2010/0042888 | A1 | 2/2010 | Kuo |
| 2011/0085479 | A1 | 4/2011 | Kim et al. |
| 2011/0151887 | A1 | 6/2011 | Hakola et al. |
| 2012/0106530 | A1 | 5/2012 | Drugge et al. |
| 2013/0044621 | A1 | 2/2013 | Jung et al. |
| 2013/0114472 | A1 | 5/2013 | Tamaki et al. |
| 2013/0121316 | A1 | 5/2013 | Skov et al. |
| 2013/0223296 | A1 | 8/2013 | Zeng et al. |
| 2013/0308523 | A1 | 11/2013 | Lee et al. |
| 2014/0010128 | A1 | 1/2014 | He et al. |

FOREIGN PATENT DOCUMENTS

| | | |
|---|---|---|
| WO | 2010/110561 | 9/2010 |
| WO | 2011/127100 | 10/2011 |

OTHER PUBLICATIONS

ETSI TS 136.211 V10.4.0: "3GPP LTE: Evolved Universal Terrestrial Radio Access (E-UTRA); Physical Channels and Modulation"; Jan. 2012; 103 pages.
ETSI TS 136.213 V10.3.0: "3GPP LTE:Evolved Universal Terrestrial Radio Access (E-UTRA); Physical layer procedures"; Oct. 2011, 123 pages.
LG Electronics; "Enhancement for CSI Transmission in LTE-A Rel-11"; Final Report of 3GPP TSG RAN WG1 #66bis v1.0.0, R1-113182; Zhuhai, P. R. China, Oct. 10-14, 2011, 2 pages.
Nokia et al., "UL ACK/NAK Feedback for Power-Limited UE in LTE-A TDD", R1-102939; 3GPP TSG RAN WG1 Meeting #61; Montreal, Canada; May 10-14, 2010, 4 pages.
Research in Motion UK Limited; "PSS/SSS Detection in Heterogeneous Networks"; Final Report of 3GPP TSG RAN WG1 #66 v1.0.0, R1-112369; Athens, Greece, Aug. 22-26, 2011, 6 pages.
Invitation to Pay Additional Fees and Partial International Search issued in international application No. PCT/US2013/022735 dated May 2, 2013, 7 pages.
International Search Report and Written Opinion of the International Searching Authority issued in International Application No. PCT/US2013/022735 dated Jul. 30, 2013; 21 pages.
International Preliminary Report on Patentability under Chapter 1 issued in International Application No. PCT/US2013/022735 dated Aug. 7, 2014; 16 pages.
Office Action issued in Taiwanese Application No. 102103012 dated Oct. 27, 2017; 8 pages.
Office Action issued in Taiwanese Application No. 107118981 dated Jan. 2, 2019, 20 pages.
Office Action issued in U.S. Appl. No. 14/928,127 dated Nov. 16, 2017, 20 pages.
United States Notice of Allowance in U.S. Appl. No. 14/928,127 dated Feb. 5, 2018, 14 pages.
United States Supplemental Notice of Allowance in U.S. Appl. No. 14/928,127 dated Mar. 2, 2018, 14 pages.
United States Office Communication in U.S. Appl. No. 14/928,127 dated Apr. 17, 2018, 4 pages.
Non-Final Office Action issued in U.S. Appl. No. 15/970,576 dated Apr. 18, 2019, 26 pages.
Communication pursuant to Article 94(3) EPC issued in European Application 13704655.3 dated Feb. 8, 2019, 9 pages.
European Office Action issued in European Application No. 17709890.2 dated Sep. 7, 2018, 3 pages.
Office Action issued in Taiwanese Application No. 108104271 dated Dec. 15, 2020, 10 pages (With Partial English Translation).

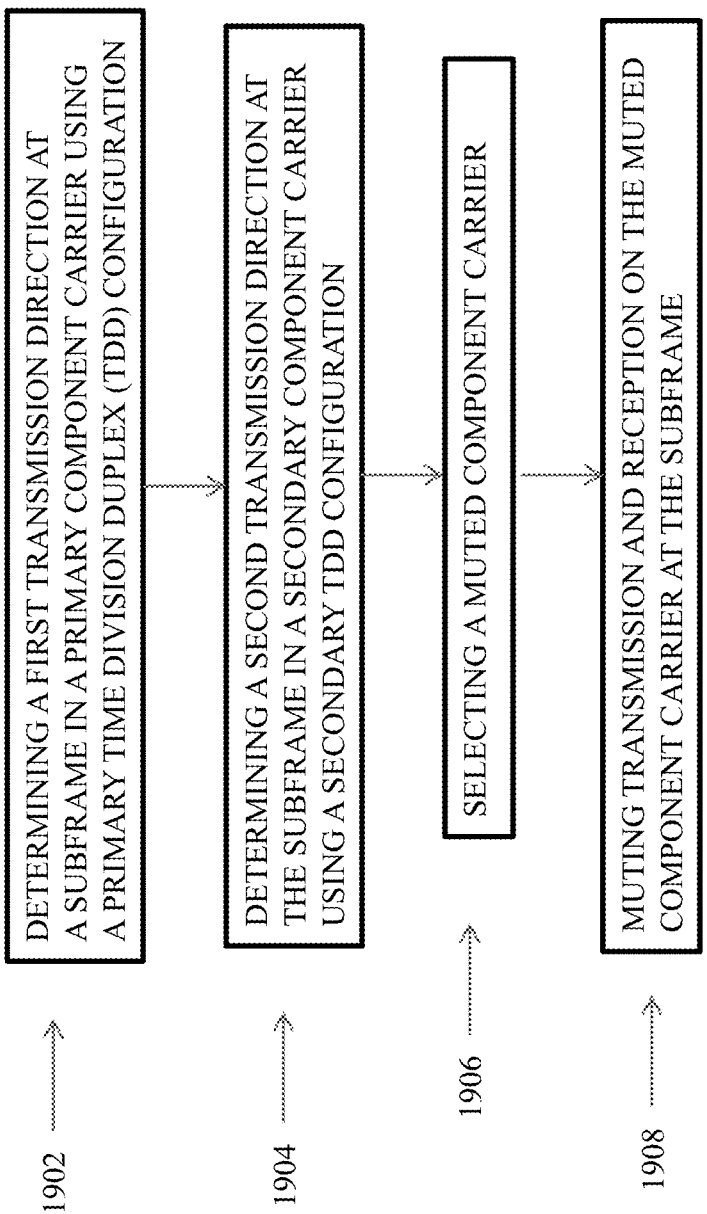

SYSTEM AND METHOD FOR SUPPORTING INTER-BAND CARRIER AGGREGATION WITH DIFFERENT UL/DL TDD CONFIGURATIONS

CLAIM OF PRIORITY

This application is a continuation of and claims priority to U.S. patent application Ser. No. 15/970,576, filed on May 3, 2018, which is a continuation of and claims priority to U.S. patent application Ser. No. 14/928,127, filed on Oct. 30, 2015, which is a continuation of and claims priority to U.S. patent application Ser. No. 13/360,625, filed on Jan. 27, 2012, the entire contents of which are hereby incorporated by reference.

BACKGROUND

The present disclosure relates generally to data transmission in communication systems and, more specifically, to methods and systems for supporting inter-band carrier aggregation with different UL/DL TDD configurations.

As used herein, the terms "user equipment" and "UE" can refer to wireless devices such as mobile telephones, personal digital assistants (PDAs), handheld or laptop computers, and similar devices or other User Agents ("UA") that have telecommunications capabilities. In some embodiments, a UE may refer to a mobile, wireless device. The term "UE" may also refer to devices that have similar capabilities but that are not generally portable, such as desktop computers, set-top boxes, or network nodes.

In some instances, wireless networks communicate with wireless User Equipment (UE) using, for example, base stations that transmits signals throughout a geographical region known as a cell. For example, long-term evolution (LTE) systems include evolved NodeBs (eNBs) for communicating with UEs. As used herein, the phrase "base station" will refer to any component or network node, such as a traditional base station or an LTE or LTE-A base station (including eNBs), that can provide a UE with access to other components in a telecommunications system. In LTE systems, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, determining the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

To facilitate communications, a plurality of different communication channels is established between a base station and a UE including, among other channels, a Physical Downlink Control Channel (PDCCH). As the label implies, the PDCCH is a channel that allows the base station to control a UE during downlink data communications. To this end, the PDCCH is used to transmit scheduling assignment or control data packets referred to as Downlink Control Information (DCI) packets to a UE to indicate scheduling to be used by the UE to receive downlink communication traffic packets on a Physical Downlink Shared Channel (PDSCH) or transmit uplink communication traffic packets on a Physical Uplink Shared Channel (PUSCH) or specific instructions to the UE (e.g., power control commands, an order to perform a random access procedure, or a semi-persistent scheduling activation or deactivation). A separate DCI packet may be transmitted by the base station to a UE for each traffic packet/sub-frame transmission.

It is generally desirable to provide high data rate coverage using signals that have a high Signal to Interference Plus Noise ratio (SINR) for UEs serviced by a base station. Typically, only those UEs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

In some cases, carrier aggregation can be used to support wider transmission bandwidths and increase the potential peak data rate for communications between a UE, base station or other network components. In carrier aggregation, multiple component carriers are aggregated and may be allocated in a sub-frame to a UE. Carrier aggregation in a communications network may include component carriers with each carrier having a bandwidth of 20 MegaHertz (MHz) and the total system bandwidth is 100 MHz. In this configuration, a UE may receive or transmit on multiple component carriers (e.g., five carriers), depending on the UE's capabilities. In some cases, depending on the network deployment, carrier aggregation may occur with carriers located in the same band or carriers located in different bands. For example, one carrier may be located at 2 GHz and a second aggregated carrier may be located at 800 MHz.

In network communications, information describing the state of one or more of the carriers or communication channels established between a UE and a base station can be used to assist a base station in efficiently allocating the most effective resources to a UE. Generally, this channel state information (CSI) includes measured CSI at a UE and can be communicated to the base station within uplink control information (UCI). In some cases, in addition to the CSI, UCI may also contain Hybrid Automatic Repeat reQuest (HARQ) acknowledgment/negative acknowledgement (ACK/NACK) information in response to PDSCH transmissions on the downlink. HARQ ACK/NACK transmissions are used to signal successful receipt of data transmissions and to request retransmissions of data that was not received successfully. Depending upon the system implementation, the CSI may include combinations of one or more of the following as channel quality information: Channel Quality Indicator (CQI), Rank Indication (RI), and/or Precoding Matrix Indicator (PMI). For LTE-Advanced (LTE-A) (beginning with Rel-10), depending upon the system implementation, there may be more channel quality information types in addition to the formats listed above.

As for duplex modes, downlink and uplink transmissions are organized into two duplex modes, i.e., frequency division duplex (FDD) mode and time division duplex (TDD) mode. The FDD mode uses paired spectrum where the frequency domain is used to separate the uplink (UL) and downlink (DL) transmission. In TDD systems, on the other hand, unpaired spectrum is used where both UL and DL are transmitted over the same carrier frequency. The UL and DL are separated in the time domain.

In 3GPP LTE TDD systems, a subframe of a radio frame can be a downlink, an uplink or a special subframe (the special subframe comprises downlink and uplink time regions separated by a guard period for downlink to uplink switching). The 3GPP specification defines seven different UL/DL configuration schemes in LTE TDD operations. They are listed in Table 1 as follows:

TABLE 1

LTE TDD Uplink-downlink configurations

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents downlink subframes, U is for uplink subframes and S represents special frame which include three parts: i) the downlink pilot time slot (DwPTS): ii) the uplink pilot time slot (UpPTS); and iii) the guard period (GP). As Table 1 shows, there are two switching point periodicities specified in the LTE standard, 5 ms and 10 ms. 5 ms switching point periodicity is introduced to support the co-existence between LTE and low chip rate UTRA TDD systems and 10 ms switching point periodicity is for the coexistence between LTE and high chip rate UTRA TDD system. The supported configurations cover a wide range of UL/DL allocations from DL heavy 9:1 ratio to UL heavy 2:3 ratio. Therefore, compared to FDD, TDD systems have more flexibility in terms of the proportion of resources assignable to uplink and downlink communications within a given assignment of spectrum. Specifically, it is possible to distribute the radio resources unevenly between uplink and downlink. This will provide a way to utilize radio resources more efficiently by selecting an appropriate UL/DL configuration based on interference situation and different traffic characteristics in DL and UL.

In regards to scheduling and HARQ timing in LTE TDD, since the UL and DL transmissions are not continuous, the scheduling and HARQ timing relationships are separately defined in the related LTE specifications. Currently, the HARQ ACK/NACK timing relationship for downlink is defined by 3GPP LTE Release 10, an example of which is shown in Table 2 below. The data in Table 2 associates an UL sub-frame n, which conveys ACK/NACK, with DL sub-frames $n-k_i$, i=0 to M−1.

TABLE 2

| UL-DL Configuration | Downlink association set index K: $\{k_0, k_1, \ldots k_{M-1}\}$ Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The uplink HARQ ACK/NACK timing linkage defined by LTE Release 10, an example of which is shown in Table 3 below. Table 3 indicates that the PHICH ACK/NACK received in DL sub-frame i is linked with the UL data transmission in UL sub-frame i−k, k. In addition, for UL/DL configuration 0, sub-frames 0 and 5 include $I_{PHICH}=1$, k=6. This is because there are two ACK/NACKs transmitted in subframes 0 and 5.

TABLE 3

| TDD UL/DL Configuration | k for HARQ ACK/NACK subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | 4 | | | 6 | | | 4 | | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

The UL grant, ACK/NACK and transmission, retransmission relationship is listed in Table 4 below. The UE may upon detection of a PDCCH with DCI format 0 or a PHICH transmission in sub-frame n intended for the UE, adjust the corresponding PUSCH transmission in sub-frame n+k, with k given in Table 4.

For TDD UL/DL configuration 0, the LSB of the UL index in the DCI format 0 is set to 1 in sub-frame n or a PHICH is received in sub-frame n=0 or 5 in the resource corresponding to $I_{PHICH}=1$, or PHICH is received in sub-frame n=1 or 6, the UE shall adjust the corresponding PUSCH transmission in sub-frame n+7. If, for TDD UL/DL configuration 0, both the MSB and LSB of the UL index in the DCI format 0 are set in sub-frame n, the UE shall adjust the corresponding PUSCH transmission in both sub-frames n+k and n+7, with k given in Table 4.

TABLE 4

| TDD UL/DL Configuration | k for PUSCH transmission subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   |   | 6 |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic illustrating Secondary Cell (SCell) timing linkage for cross-carrier scheduling (c-scheduling) with Primary Cell (PCell) configuration 0 and SCell configuration 1;

FIG. 3 is a schematic illustrating SCell timing linkage for separate scheduling with PCell configuration 0 and SCell configuration 1;

FIG. 6 is a schematic illustrating SCell timing linkage for c-scheduling with PCell configuration 2 and SCell configuration 6;

FIG. 7 is a schematic illustrating SCell timing linkage for c-scheduling with PCell configuration 6 and SCell configuration 2;

FIG. 12 is a schematic illustrating of CA between two different switch periodicity configurations with PCell configuration 3 and SCell configuration 1;

FIG. 13 is a schematic illustrating SCell timing linkage for c-scheduling with PCell configuration 3 and SCell configuration 1;

FIG. 14 is a schematic illustrating CA between configuration 0 and configuration 5;

FIG. 15 is a schematic illustrating SCell timing linkage for c-scheduling with PCell configuration 2 and SCell configuration 6 in half-duplex mode;

FIG. 16 is a schematic illustrating SCell timing linkage for c-scheduling with PCell configuration 6 and SCell configuration 2 in half-duplex mode;

FIG. 17 is a schematic illustrating CA with configuration 0 and 1 in half duplex mode;

FIG. 19 is flow chart illustrating example method for HARQ timing for CCs with different UL/DL configurations for a half-duplex mode.

DETAILED DESCRIPTION

Figure 1:
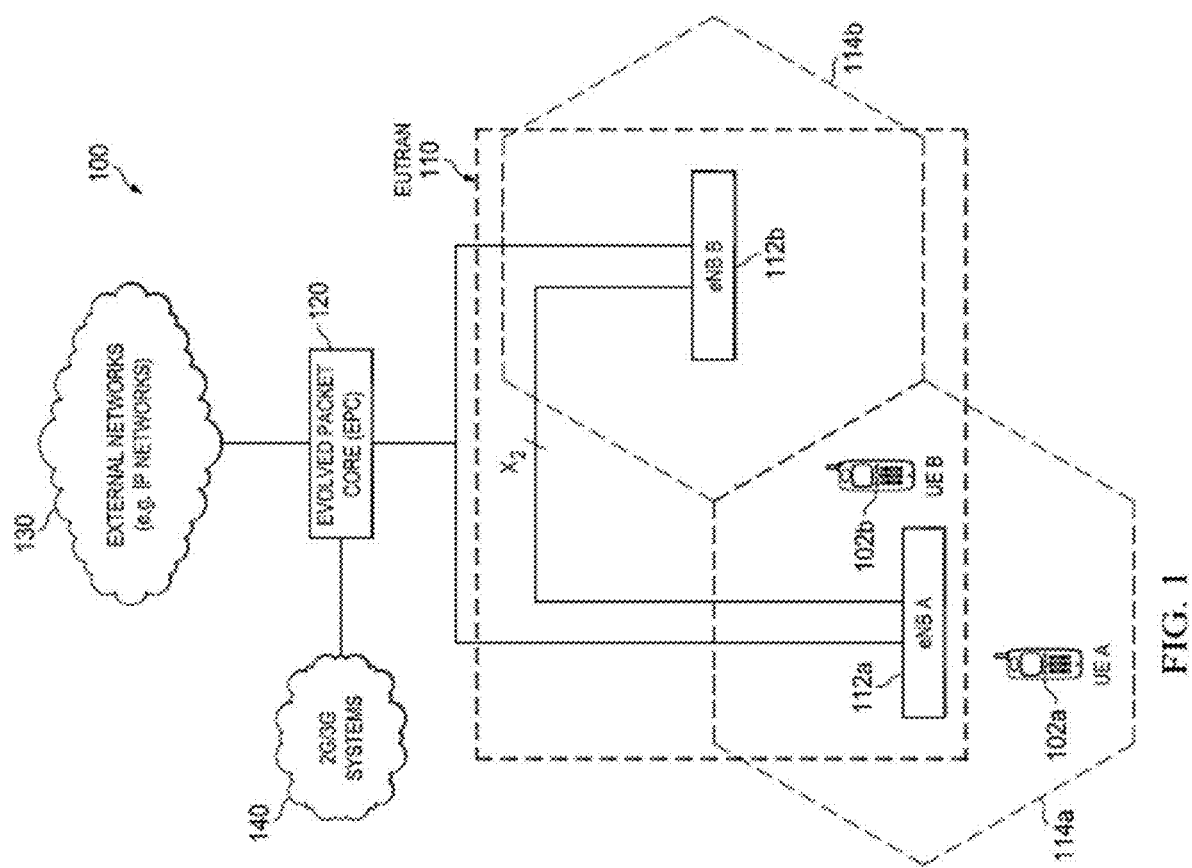
FIG. 1 is a schematic representation of an example wireless cellular communication system based on 3GPP long term evolution (LTE)

The present disclosure is directed to a system and method for scheduling and HARQ timing for aggregated TDD CCs with different Up Link/Down Link (UL/DL) configurations. For example, the disclosed systems may include inter-band carrier aggregation where component carriers in each band use different TDD configurations. In these instances, a Primary Cell (PCell) may communicate using a primary component carrier in a first frequency band having a primary TDD configuration, and a Secondary Cell (SCell) communicating using a secondary component carrier in a second frequency band different from the first frequency band having a secondary TDD configuration. In doing so, the mobile device may transmit a downlink HARQ in response to received downlink data in the second component carrier in the primary component carrier using a supplemental TDD configuration. In other words, the mobile device may transmit a downlink HARQ for the second component carrier using a TDD configuration different from the secondary TDD configuration, i.e., a supplemental TDD configuration. In the present disclosure, the term "primary" refers to aspects associated with the PCell such as the primary component carrier refers to a component carrier the PCell communicates. In addition, the term "secondary" refers to aspects associated with the SCell such as the secondary TDD configuration refers to the TDD configuration used by the SCell. In some implementations, the supplemental TDD configuration may be a union or aggregation of the TDD configuration of the PCell and the SCell. For example, the supplemental downlink TDD configuration may be a combination of the primary downlink TDD configuration and the secondary downlink TDD configuration, as discussed in more detail below. In some implementations, the supplemental configuration may be based on the duplex mode of the associated User Equipment (UE) device. For example, the supplemental configuration may be based on whether the UE operates in a full-duplex mode or a half-duplex mode. In addition, the disclosure includes determining the muting direction in the half-duplex mode.

In some implementations in full-duplex mode, the PCell may follow its own timing relationship or the primary TDD configuration for both UL and DL. In these instances, the SCell DL HARQ may follow the timing relationship or the supplemental TDD configuration having the union of DL subframe sets for two aggregated configurations. In some instances, the number of DL HARQ processes may be set to the same number as in the configuration used for DL HARQ timing, which may be the same as one of the seven HARQ timing relationships defined by the LTE standard. The SCell UL grant and UL HARQ may follow the TDD configuration including the union of UL subframe sets for two aggregated configurations. In these instances, the number UL HARQ processes may include the same number as the configuration used for UL timing. In some implementations, the scheme for the full duplex mode may be extended to more than two different configurations in more than two CC CA scenarios. For example, the supplemental downlink TDD configuration may be an aggregation of the primary downlink TDD configuration and all of the secondary downlink TDD configurations. In regards to the TDD configuration for the half-duplex mode, the scheme may be designed to support low cost UEs that do not execute simultaneous Reception/Transmission (RX/TX). To facilitate the timing design, the muting may be limited to the SCell. In some implementations, the timing relationship for the primary cell can be applied to both the primary cell and all secondary cells. In determining the muting direction in the half-duplex mode, the muting may be limited to the SCell due to timing issues. In some implementations, the scheme for the half-duplex mode may update the muting direction semi-statically based on at least one of the interference situation or traffic loading situation. For example, the PCell may be switched to the SCell and the SCell may be switched to PCell.

As previously mentioned, the supplemental TDD configuration in the full-duplex mode may reuse existing timing defined in current LTE system (Rel-8/9/10). In other words, the supplemental TDD configuration different from the secondary TDD configuration may be defined such that the result equals one of the seven TDD configurations defined by the LTE standard. For example, the supplemental TDD configuration may be based on a first carrier $C_1$ and a second carrier $C_2$ having different UL/DL configurations and defined as followed:

DL Union (DLU)=$DL_1 \cup DL_2$, where $DL_1$ and $DL_2$ are the downlink subframe sets of configuration $C_1$ and $C_2$.

UL Union (ULU)=$UL_1 \cup UL_2$, where $UL_1$ and $UL_2$ are the uplink subframe sets of configuration $C_1$ and $C_2$.

PCell follows its own UL/DL configuration or primary TDD configuration. PCell here could be either $C_1$ or $C_2$.

SCell DL HARQ follows the timing of configuration with the same DL subframe pattern as DLU, which matches one of the seven existing configurations in Table 1.

SCell UL grant and UL HARQ follow the timing configuration with the same UL subframe pattern as ULU, which matches one of seven existing configurations in Table 1.

Alternatively, this rule may be defined such that SCell DL HARQ follows the timing configuration including the superset of DL subframes, while SCell UL grant and UL HARQ follow the timing configuration including the superset of UL subframes. The number of DL or UL HARQ processes may be set to the same configuration used for DL or UL HARQ timing, respectively. In this way, the timing linkage for scheduling and HARQ on both CCs may follow the existing timing rules defined in Release 8/9/10. The above rules may be applicable to both separate scheduling and cross-carrier scheduling cases. By following these implementations, the inter-band TDD CA with different UL/DL configurations may be possible for both high cost UEs, i.e., the UEs capable of supporting simultaneous RX/TX or full-duplex mode, and low cost UEs, i.e., UEs only capable to communication in one direction at a time or half-duplex mode. In half-duplex mode, the muting direction may be semi-statically changed based on the interference condition and traffic situation.

The mobile electronic devices described above may operate in a cellular network, such as the network shown in FIG. 1, which is based on the third generation partnership project (3GPP) long term evolution (LTE), also known as Evolved Universal Terrestrial Radio Access (E-UTRA). More specifically, FIG. 1 is a schematic representation of an example wireless cellular communication system 100 based on 3GPP long term evolution. The cellular network system 100 shown in FIG. 1 includes a plurality of base stations 112. In the LTE example of FIG. 1, the base stations are shown as evolved Node B (eNB) 112. It will be understood that the base station may operate in any mobile environment including femtocell, picocell, or the base station may operate as a node that can relay signals for other mobile and/or base stations. The example LTE telecommunications environment 100 of FIG. 1 may include one or a plurality of radio access networks 110, core networks (CNs) 120, and external networks 130. In certain implementations, the radio access networks may be Evolved Universal Mobile Telecommunications System (UMTS) terrestrial radio access networks (EUTRANs). In addition, in certain instances, core networks 120 may be evolved packet cores (EPCs). Further, there may be one or more mobile electronic devices 102 operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

In the example LTE system shown in FIG. 1, the EUTRAN 110 comprises eNB 112a and eNB 112b. Cell 114a is the service area of eNB 112a and Cell 114b is the service area of eNB 112b. UE 102a and 102b operate in Cell 114a and are served by eNB 112a. The EUTRAN 110 can comprise one or a plurality of eNBs 112 and one or a plurality of UEs can operate in a cell. The eNBs 112 communicate directly to the UEs 102. In some implementations, the eNB 112 may be in a one-to-many relationship with the UE 102, e.g., eNB 112a in the example LTE system 100 can serve multiple UEs 102 (i.e., UE 102a and UE 102b) within its coverage area Cell 114a, but each of UE 102a and UE 102b may be connected only to one eNB 112a at a time. In some implementations, the eNB 112 may be in a many-to-many relationship with the UEs 102, e.g., UE 102a and UE 102b can be connected to eNB 112a and eNB 112b. The eNB 112a may be connected to eNB 112b with which handover may be conducted if one or both of UE 102a and UE 102b travels from eNB 112a to eNB 112b. UE 102 may be any wireless electronic device used by an end-user to communicate, for example, within the LTE system 100. The UE 102 may be referred to as mobile electronic device, user device, mobile station, subscriber station, or wireless terminal. UE 102 may be a cellular phone, personal data assistant (PDA), smart phone, laptop, tablet personal computer (PC), pager, portable computer, or other wireless communications device.

UEs 102 may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 102 and eNBs 112 may be contaminated by multipath fading, due to the multiple signal paths arising from many reflections in the wireless environment. Accordingly, the UEs' transmission may adapt to the wireless environment. In short, UEs 102 generate requests, send responses or otherwise communicate in different means with Enhanced Packet Core (EPC) 120 and/or Internet Protocol (IP) networks 130 through one or more eNBs 112.

A radio access network is part of a mobile telecommunication system which implements a radio access technology, such as UMTS, CDMA2000 and 3GPP LTE. In many applications, the Radio Access Network (RAN) included in a LTE telecommunications system 100 is called an EUTRAN 110. The EUTRAN 110 can be located between UEs 102 and EPC 120. The EUTRAN 110 includes at least one eNB 112. The eNB can be a radio base station that may control all or at least some radio related functions in a fixed part of the system. The at least one eNB 112 can provide radio interface within their coverage area or a cell for UEs 102 to communicate. eNBs 112 may be distributed throughout the cellular network to provide a wide area of coverage. The eNB 112 directly communicates to one or a plurality of UEs 102, other eNBs, and the EPC 120.

The eNB 112 may be the end point of the radio protocols towards the UE 102 and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication system includes IEEE 802.11 wireless local area network, IEEE 802.16 WiMAX network, etc.

Figures 2, 3:
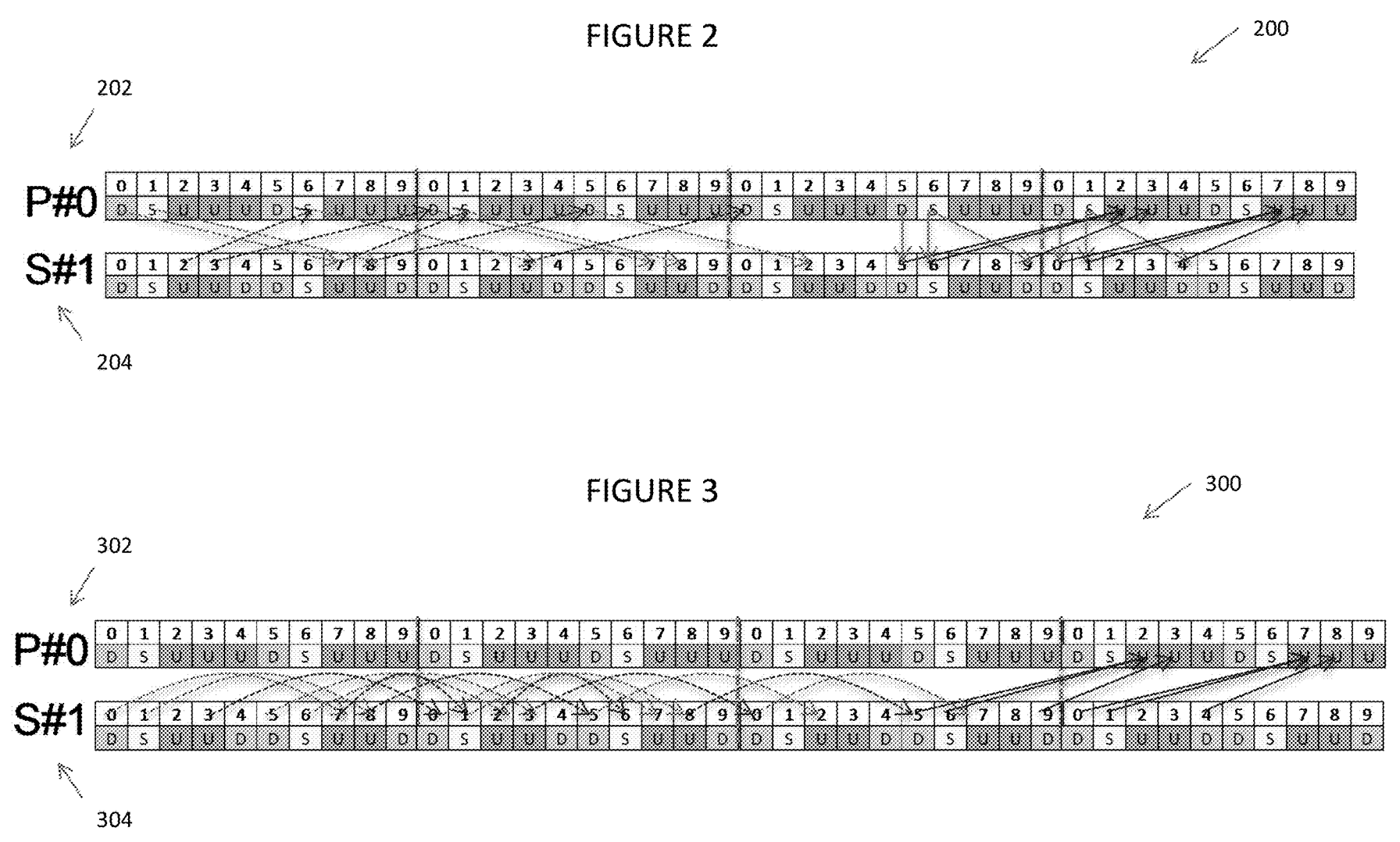

FIG. 2 is a schematic 200 illustrating aggregating two CCs with configuration 0 and 1 in accordance with some implementations of the present disclosure. As illustrated, the schematic 200 includes a timing linkage for c-scheduling with Primary Cell (PCell) 202 having a configuration 0 and a Secondary Cell (SCell) 204 having a configuration 1. In these implementations, the downlink subframe union or supplemental downlink TDD configuration and the uplink subframe union or supplemental uplink TDD configuration are defined as followed:
DL(conf #0)={0, 1, 5, 6}, DL(conf #1)={0, 1, 4, 5, 6, 9}; So, DLU={0, 1, 4, 5, 6, 9}, matches conf #1.
UL(conf #0)={2, 3, 4, 7, 8, 9}, DL(conf #1)={2, 3, 7, 8}; So, ULU={2, 3, 4, 7, 8, 9}, matches conf #0.
If the PCell 202 is has configuration 0, the PCell 202 may follow its own configuration timing. The SCell UL grant and HARQ may also follow configuration 0, and the SCell DL HARQ may follow configuration 1 timing based on the above definition. The schematic 200 only shows the SCell timing linkage for cross-carrier scheduling case and not the timing linkage for the PCell 202 as it is the same as in the current specification.

Since the number of UL subframes with SCell configuration 1 is less than the number of UL subframes in configuration 0, the UL index may not be varied in scheduling, and $I_{PHICH}$ may not be varied in ACK/NACK identification. The UL index value and $I_{PHICH}$ may be set to a fixed value, e.g., LSB=1, MSB=0 as well as $I_{PHICH}$=1. Alternatively, the UL index may not be included in the UL grant for SCell's PUSCH scheduling as UL index is used, for example, for UL/DL configuration 0 only. The former approach may keep a DCI format size for SCell's PUSCH the same as the one for PCell's PUSCH which may be desirable for cross-carrier scheduling to share the search space. Not including UL index for the separate scheduling may reduce the DCI format size. Since UL index and Downlink Assignment Index (DAI) share the same two bits in DCI0, collision between these two fields is typically avoided. In some implementations, the UL index may only be used for configuration 0 due to a large number of UL subframes. Any other configurations, except for configuration 6, which use configuration 0 as UL scheduling timing may not use the UL index bits. If there is potential collision with DAI bits, UL index bits may not be included. For configuration 6, the cross-carrier scheduling may be disabled and only use separate scheduling. For SCell subframe #4 and #9, there may be no DL PDCCH at the same TTI to schedule them. For subframe #4 and #9, one or more of the following may be executed: (a) cross TTI scheduling (shown in schematic 200, #4 SCell is scheduled by PCell subframe #1); (b) bundle scheduling, e.g. same grant for SCell #4 and #1; (c) temporarily disable cross-carrier scheduling, the SCell #4 and #9 are scheduled by SCell itself; or others.

FIG. 3 is a schematic 300 illustrating the SCell timing linkage for separate scheduling case based on one or more implementations in the present disclosure. In particular, the schematic 300 includes PCell 302 and SCell 304 illustrating SCell timing linkage for s-scheduling with PCell configuration 0 and SCell configuration 1. In these implementations, the SCell subframe #0 and #5 may not be configured with any PHICH resource for the UL/DL configuration 1. To be able to transmit ACK/NACK on those subframes, PHICH resource may be configured on those subframes for a new release UE. The legacy UE may not know this newly configured PHICH resource, which may be discarded. The PDCCH blind decoding may not be able to pick it up. Alternatively, only resource adaptive retransmission with UL grant may be supported without PHICH reception for PUSCH in subframe #3 and #8.

Alternatively, the current timing relationship may be reused and the new proposed rule may be applied only in case there is a problem with the current scheduling and HARQ timing. More specifically, for separate scheduling case, the UE may execute a second method including the following: PCell 302 follows its own UL/DL configuration timing relationship; SCell DL HARQ follows the timing of configuration with the same DL subframe pattern as DLU; and SCell UL grant and UL HARQ follow its own UL/DL configuration timing relationship.

Figures 4, 5:
FIG. 4 is a schematic illustrating SCell timing linkage for separate scheduling using another implementation of the present disclosure.
FIG. 5 is a schematic illustrating SCell timing linkage for c-scheduling with PCell configuration 1 and SCell configuration 0.

FIG. 4 is a schematic 400 illustrating the SCell timing linkage executing the second method previously discussed. In particular, the schematic 400 includes the PCell 402 and the SCell 404 where the SCell UL grant and UL HARQ follow its own UL/DL configuration timing relationship as compared with an UL union. These implementations may not include the zero PHICH resource issue as previously discussed. The UL HARQ cycle may be shorter as well. With carrier aggregation, the load on both PUCCH and PHICH increases. Although the new timing linkage may be used, it may still follow one of the existing UL/DL configurations. In these instances, the current PUCCH and PHICH structure may be supported. For example, for PUCCH, PUCCH format 1b with channel selection may be configured with up to 4 ACK/NACK bits transmission. Otherwise, if the capacity is exceeded, PUCCH format 3 may be used. For PHICH, the amount of PHICH resource may be adjusted by phich-Resource, Ng, in PHICH-Config IE.

FIG. 5 is a schematic 500 illustrating SCell timing linkage where the primary cell is configuration 1 and the secondary cell is configuration 0. In particular, the schematic 500 includes PCell 502 and SCell 504 where the SCell timing linkage for c-scheduling with PCell configuration 1 and SCell configuration 2. In these implementations, with cross-carrier scheduling, the SCell UL grant and UL HARQ may follow configuration 0 timing and DL HARQ may follow configuration 1.

Figures 6, 7:
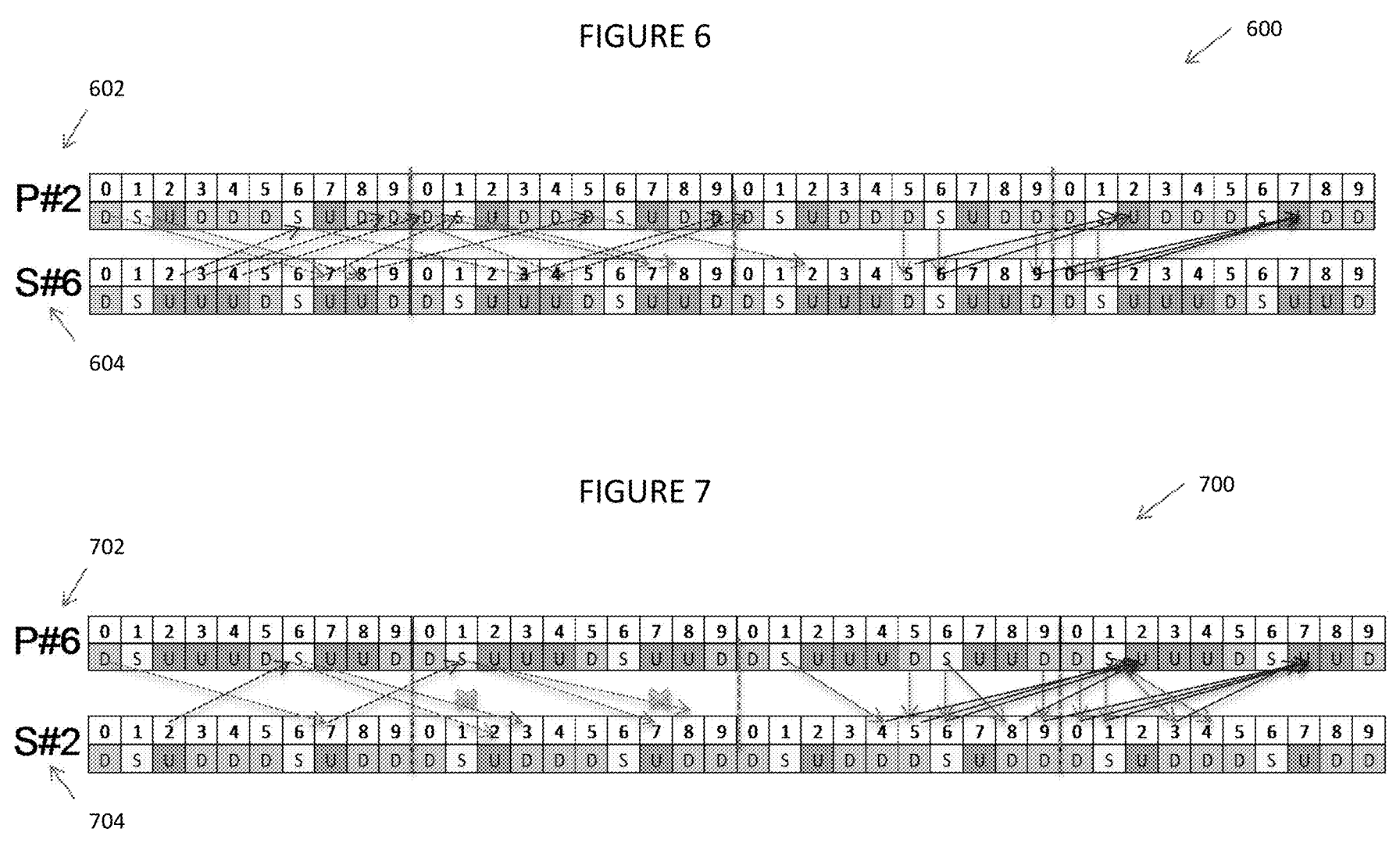

FIGS. 6-11 illustrate schematics 600-1100, respectively, for timing linkage in full duplex mode for special cases in regards to UL grant timing and UL HARQ timing. Referring to FIGS. 6 and 7, the schematic 600 and 700 illustrate an example with a combination of configuration 2 and configuration 6 where the DLU matches configuration 2 and ULU matches configuration 6. In particular, the schematic 600 includes PCell 602 and SCell 604 where the SCell timing linkage for c-scheduling with PCell configuration 2 and SCell configuration 6, and the schematic 700 includes the PCell 702 and the SCell 704 where SCell timing linkage for c-scheduling with PCell configuration 6 and SCell configuration 2. In other words, FIGS. 6 and 7 illustrate the timing linkage for the secondary cell with different primary cell configurations. In FIG. 7, when the PCell 702 is configuration 6, the retransmission for NACK from subframe #1, #6 would be on SCell subframe #8, #3 which is not a UL subframe. The retransmission may be amended to subframe #7, #2. This situation may also apply to the initial UL grant. The similar scenario may occur with a few other configuration combinations as shown below.

Figure 8:
FIG. 8 is a schematic illustrating SCell timing linkage for c-scheduling with PCell configuration 2 and SCell configuration 0.
Figure 8:
Figure 9:
FIG. 9 is a schematic illustrating SCell timing linkage for c-scheduling with PCell configuration 0 and SCell configuration 2.
Figure 9:

Referring to FIGS. 8 and 9, the schematic 800 and 900 illustrate an example with a combination of configuration 0 and configuration 2. In particular, the schematic 800 includes PCell 802 and SCell 804 where the SCell timing linkage for c-scheduling with PCell configuration 2 and SCell configuration 0, and the schematic 900 includes the PCell 902 and the SCell 904 where SCell timing linkage for c-scheduling with PCell configuration 0 and SCell configuration 2. With this combination, the SCell UL grant and HARQ follow the configuration 0 timing, and the DL HARQ is following configuration 2. SCell subframe #8 and #3 may not be UL subframes for the UL transmission or retransmission. As shown in FIGS. 7 and 9, the solution may include using (the original subframe index–1) instead. In some implementations, the resulting subframe index for transmission or retransmission cannot be less than n+4, while n is the subframe index conveying the grant or NACK.

Figure 10:
FIG. 10 is a schematic illustrating SCell timing linkage for c-scheduling with PCell configuration 1 and SCell configuration 6.
Figure 10:
Figure 11:
FIG. 11 is a schematic illustrating SCell timing linkage for c-scheduling with PCell configuration 6 and SCell configuration 1.
Figure 11:

Referring to FIGS. 10 and 11, the schematic 1000 and 1100 illustrate an example with a combination of configuration 1 and configuration 6. In particular, the schematic 1000 includes PCell 1002 and SCell 1004 where the SCell timing linkage for c-scheduling with PCell configuration 1 and SCell configuration 6, and the schematic 1100 includes the PCell 1102 and the SCell 1104 where the SCell timing linkage for c-scheduling with PCell configuration 6 and SCell configuration 1. Based on the proposed method, the SCell UL grant and HARQ may follow the configuration 6 timing. DL HARQ may follow configuration 1. In FIG. 11, subframe #4 may not be an UL, and, if minus one, the subframe #3 may be occupied by the retransmission for NACK from subframe #6. In these instances, the transmission or retransmission may be on the next available UL subframe, which is subframe #7 in this case.

In summary, regarding FIGS. 6-11, these special cases may occur when the primary cell DL subframe set is the subset of the secondary cell DL subframe set. In these instances, the following may be executed: the current transmission or retransmission subframe index, m, minus one (m−1) if (m−1) is not less than n+4, while n is the subframe index conveying the grant or NACK; otherwise, or if the m−1 subframe is occupied, transmit or retransmit on the next available UL subframe; and the eNB may have the knowledge of the situation and determine when to expect the transmission or retransmission.

Figures 12, 13:
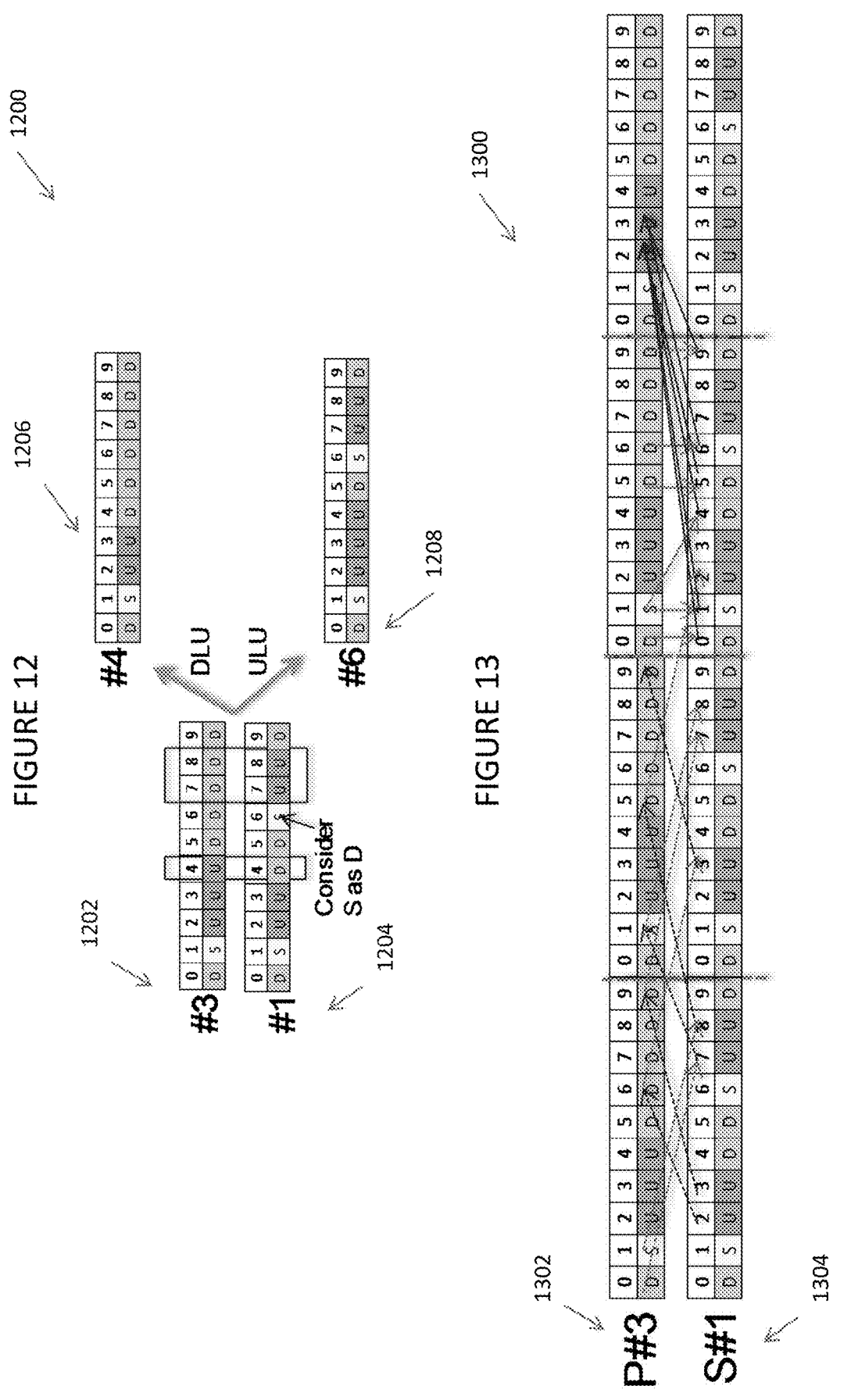

FIGS. 12 and 13 are schematics 1200 and 1300, respectively, illustrating timing linkage in full duplex mode with two CCs with different switch periodicities. Two switch periodicities are frequently introduced for compatibility with different chip rate legacy systems. 5 ms switching point periodicity may be introduced to support the coexistence between LTE and low chip rate UTRA TDD systems, and 10 ms switching point periodicity may be for the coexistence between LTE and high chip rate UTRA TDD system. The possibility of aggregating carriers with different switching periodicity configurations may be low, but the methods previously discussed may also work with the different switch periodicity configurations.

Referring to FIG. 12, the schematic 1200 illustrates that PCell 1202 and SCell 1204 where the ULU 1206 is configuration 4 and the DLU 1208 is configuration 6. Since configuration 1 has two special subframes, one may be identified as a DL subframe. In the instances, the DLU 1206 is equivalent to configuration 4; while ULU 1208 is equivalent to configuration 6. The secondary cell UL grant and HARQ may follow configuration 6 timing linkage and DL HARQ may follow configuration 4. Referring to FIG. 13, the schematic 1300 includes PCell 1302 and the SCell 1304 where SCell timing linkage for c-scheduling with PCell configuration 3 and SCell configuration 1. In particular, the schematic 1300 illustrates the secondary cell timing linkage with configuration 3 as the primary cell and configuration 1 as the secondary cell in the case of cross-carrier scheduling.

In addition to FIGS. 2-13, the time linkage in the full duplex mode may be extend to more than two different configurations. For example, in the case with five different UL/DL configurations, $C_P$ and $C_{S1}$, $C_{S2}$, $C_{S3}$, $C_{S4}$, on different CCs may be aggregated together. $C_P$ may be the primary cell and $C_{Si}$ i=1, 2, 3, 4, may be the secondary cells. The timing linkage or supplemental TDD configuration may be defined as followed: (1) $DLU_i=DL_P \cup DL_{Si}$, where $DL_P$ and $DL_{Si}$ are the downlink subframe sets of configuration $C_P$ and $C_{Si}$, i=1, 2, 3, 4; (2) $ULU_i=UL_P \cup UL_{Si}$, where $UL_P$ and $UL_{Si}$ are the uplink subframe sets of configuration $C_P$ and $C_{Si}$, i=1, 2, 3, 4; (3) PCell follows its own UL/DL configuration timing relationship; (4) SCell with $C_{Si}$, i=1, 2, 3, 4, DL HARQ follows the timing of configuration with the same DL subframe pattern as $DLU_i$; and (5) SCell with $C_{Si}$, i=1, 2, 3, 4, UL grant and UL HARQ follow the timing of configuration with the same UL subframe pattern as $ULU_i$. For separate scheduling case, the second method previously discussed may be also applied as follows: (1) PCell follows its own UL/DL configuration timing relationship; (2) SCell with $C_{Si}$, i=1, 2, 3, 4, DL HARQ follows the timing of configuration with the same DL subframe pattern as $DLU_j$; and (3) SCell with $C_{Si}$, i=1, 2, 3, 4, UL grant and UL HARQ follow its own UL/DL configuration, $C_{Si}$, timing relationship.

FIGS. 14-17 are schematics 1400-1700, respectively, that illustrate carrier aggregation in half-duplex mode. These implementations are designed for the low cost UE which does not support simultaneous RX/TX. To facilitate the timing design, the muting may occur on the SCell because the PUCCH may be on the primary cell and grants may come from the PCell as well if cross-carrier scheduling. The flexibility of radio subframe allocation is implemented by the approach described with respect to FIG. 17.

Figures 14, 15:
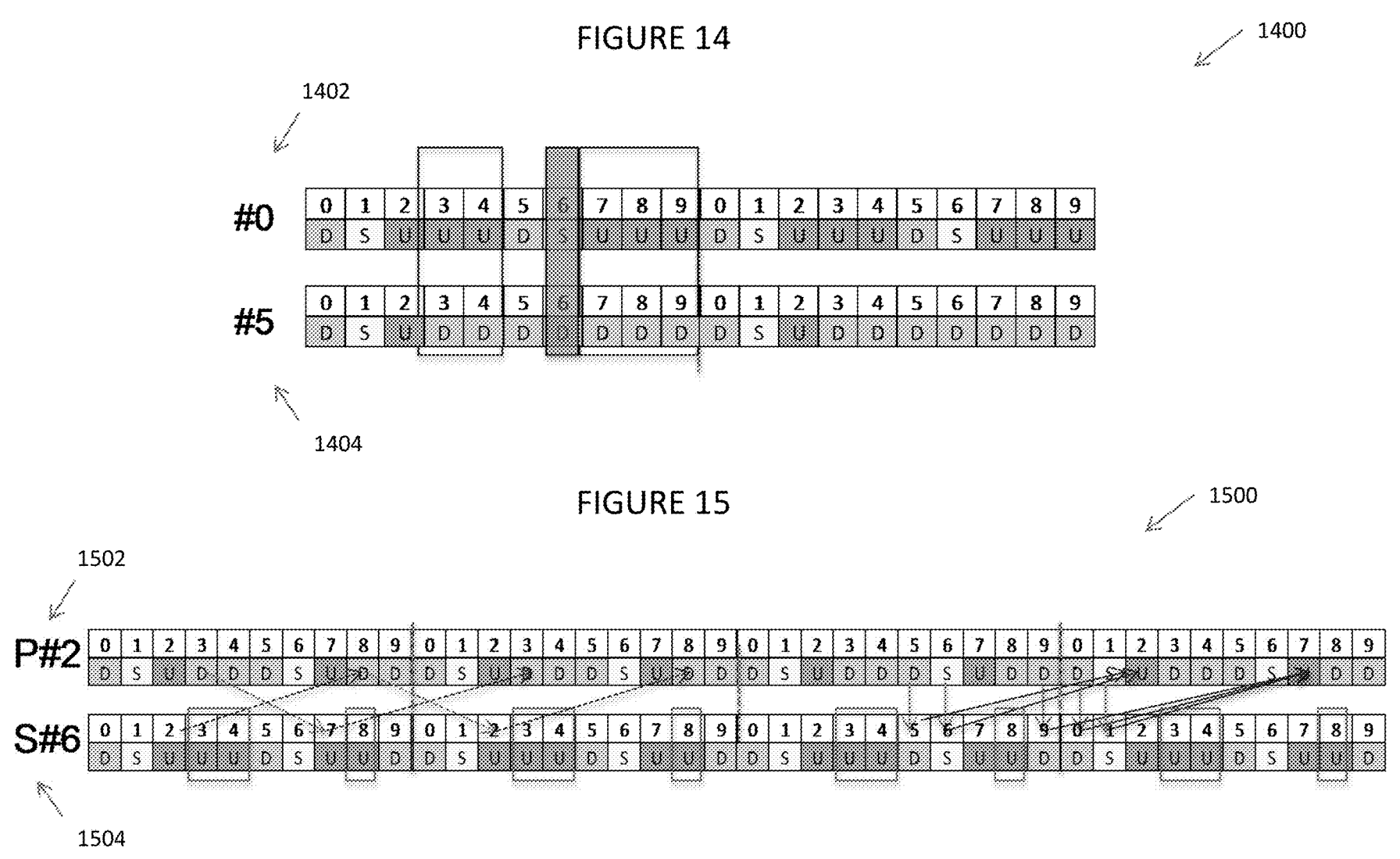

For half duplex capable UEs, CCs with different switch periodicity UL/DL configurations are typically not aggregated because the number of special subframes is different with different switch periodicities. Referring to FIG. 14, the schematic 1400 illustrates CA between configuration 0 and configuration 5. In particular, the schematic 1400 includes the cell 1402 and the cell 1404 such that subframe #6 is muted, which may lead to low resource utilization efficiency. To address this inefficiency, UEs operating in a half-duplex mode may execute one or more of the following: (1) do not consider CA with different switch periodicity configurations; (2) during conflicting subframes, execute the PCell subframe direction; use the PCell timing on all CCs; and the few exception cases are handled with the same method as in full duplex case.

Figures 16, 17:
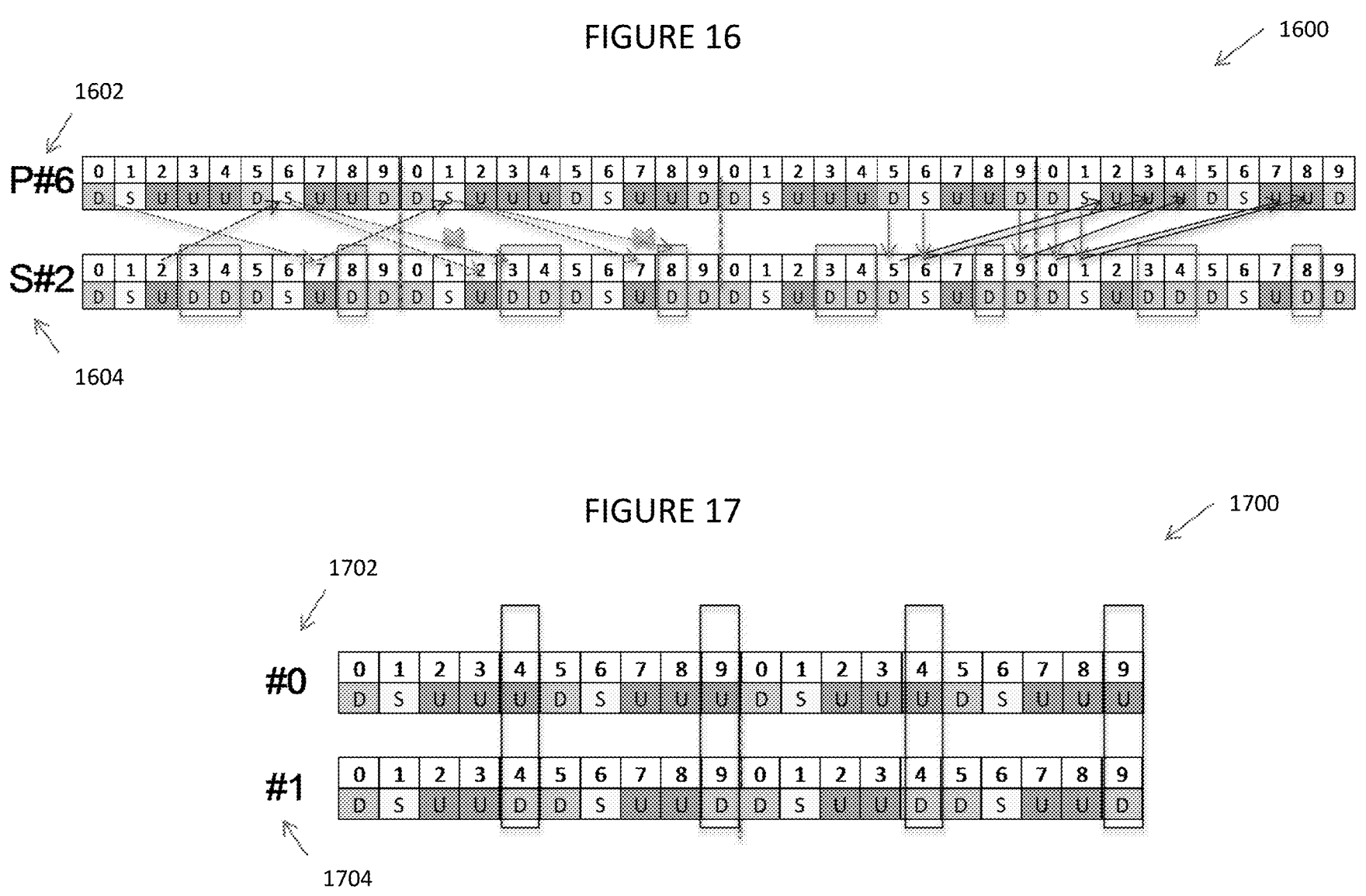

Referring to FIGS. 15 and 16, the schematics 1500 and 1600 illustrate the situation where configuration 2 and configuration 6 are aggregated with half duplex mode. In these implementations, the subframes in boxes are muted. Referring to FIG. 15, the schematic 1500 includes PCell 1502 and SCell 1504 illustrating SCell timing linkage for c-scheduling with PCell configuration 2 and SCell configuration 6. In other words, the PCell 1502 is configuration 2, so the timing relationship follows configuration 2 timing. Referring to FIG. 16, the schematic 1600 includes PCell 1602 and SCell 1604 illustrating SCell timing linkage for c-scheduling with PCell configuration 6 and SCell configuration 2. The PCell 16-2 is configuration 6, so the timing linkage follows configuration 6. In this case, the exception case appears on PCell subframes #3 and #8, so the minus one rule previously described may be applied in these instances. The implementations described in FIGS. 14-17 may be applied to both cross-carrier scheduling and separate scheduling scenarios.

In regards to determining the muting direction in the half-duplex mode, the muting, in some implementations, can occur on the SCell due to the timing issue. In these instances, the muting direction may be semi-statically based on at least one of the interference situation or traffic intensity. For example, the PCell and SCell may be switched.

Referring to FIG. 17, the schematic 1700 illustrates CA with configuration 0 and 1 in half duplex mode. In particular, the schematic 1700 includes the cell 1702 and the cell 1704 illustrating a combination of configuration 0 and 1 where the direction conflicting subframes are #4 and #9. In half duplex mode, schematic 1700 illustrates that one direction subframe is muted from both the cell 1702 and the cell 1704. The determination of the muting direction may be based on the evaluation of current interference condition (interference at least one of a certain band, time period or UL/DL direction) and traffic situation (UL or DL heavy). If the decision is to mute the DL direction, then the cell 1702 may be taken as the primary cell, all the timing relationship follows the configuration 0 timing, subframes #4 and #9 on configuration 1 may be muted and vice versa. This process may be performed periodically and the muting direction may be semi-statically changed. In some implementations, the UE may switch the PCell and SCell, in order to change the muting direction, executing the following: (1) for given period, evaluate the interference condition and traffic situation; (2) if the muting direction need to be changed, (a) handover from current PCell to deactivated SCell, (b) remove the current SCell in the SCell list, and (c) add the current PCell as a SCell; and (3) return to the initial step.

Figure 18:
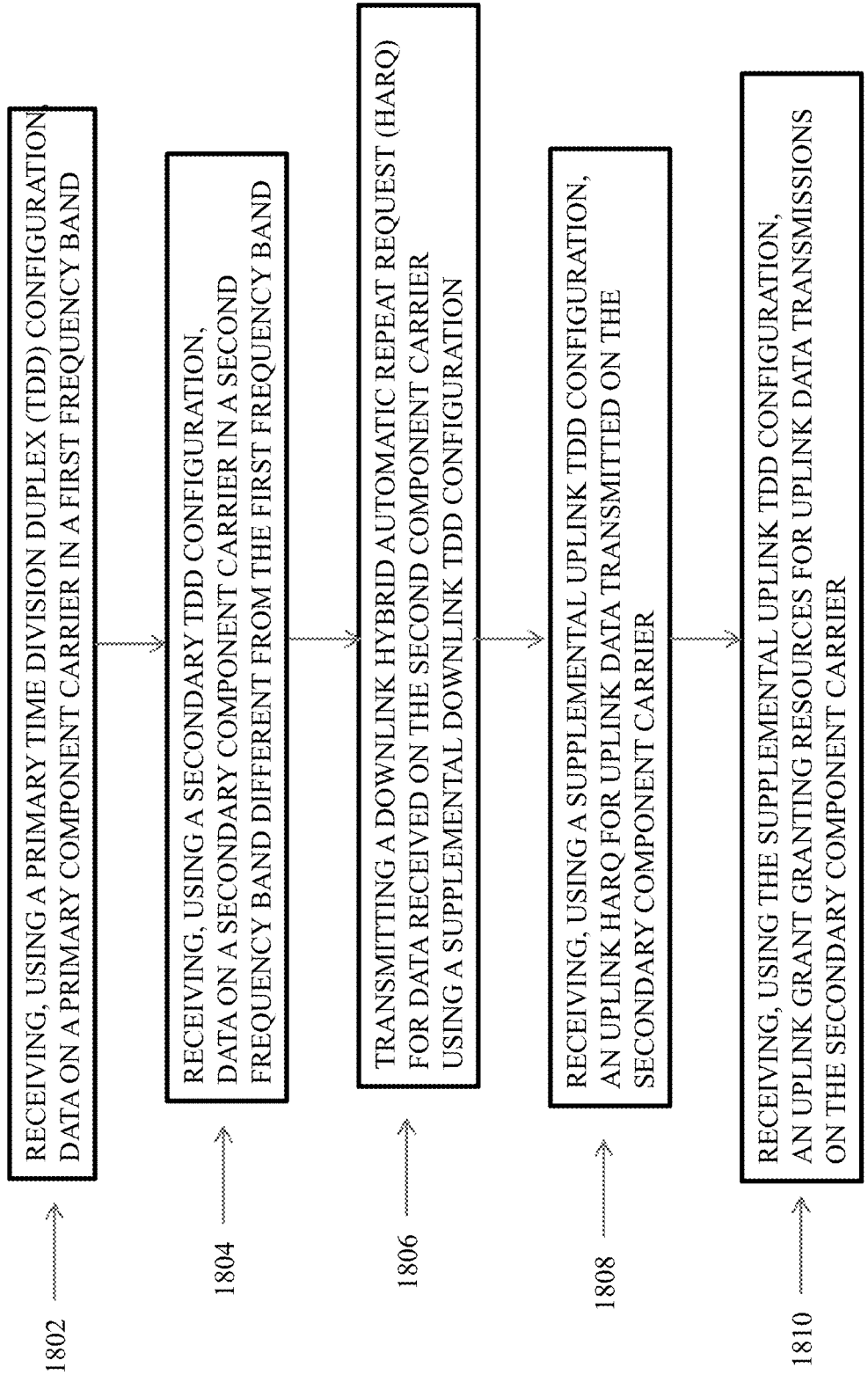
FIG. 18 is flow chart illustrating example method for HARQ timing for CCs with different UL/DL configurations for a full-duplex mode.

FIGS. 18 and 19 are flowcharts illustrating example methods for HARQ timing for CCs with different UL/DL configurations for a full-duplex mode and a half-duplex mode, respectively. These methods are for illustration purposes only and that the described or similar techniques may be performed at any appropriate time, including concurrently, individually, or in combination. In addition, many of the steps in the flowchart may take place simultaneously and/or in different orders than as shown. Moreover, systems may use methods with additional steps, fewer steps, and/or different steps, so long as the methods remain appropriate.

Referring to FIG. 18, method 1800 begins at step 1802 where, using a primary Time Division Duplex (TDD) configuration, data is received on a primary component carrier in a first frequency band. For example, the PCell may communicate downlink data to a UE using a primary component carrier in a first frequency band in accordance with a primary TDD configuration. As previously mentioned, the downlink TDD configuration for a PCell may be referred to as a primary downlink TDD configuration. At step 1804, using a secondary TDD configuration, data is received on a secondary component carrier in a second frequency band different from the first frequency band. In the example, the SCell may communicate with the UE using a secondary component carrier in a second frequency band different from the first frequency band. Similar to the PCell, the downlink TDD configuration for the SCell may be referred to the secondary downlink TDD configuration. Next, at step 1806, a Hybrid Automatic Repeat Request (HARQ) for data received on the second component carrier is transmitted using a supplemental DL TDD configuration. As for the example, the UE may transmit a downlink HARQ using a supplemental TDD configuration different from the secondary TDD configuration. In some implementations, the supplemental TDD configuration may be an aggregation of the primary TDD configuration and the secondary TDD configuration. At step 1808, using a supplemental uplink TDD configuration, an uplink HARQ for uplink data transmitted on the secondary component carrier is received. In some implementations, the supplemental uplink TDD configuration specifies a set of uplink subframes including uplink subframes in the primary TDD configuration and the secondary TDD configuration. Next, at step 1810, using the supplemental uplink TDD configuration, an uplink grant granting resources for uplink data transmissions is received on the secondary component carrier.

Referring to FIG. 19, method 1900 begins at step 1902 where a first transmission direction at a subframe in a primary component carrier is determined using a primary Time Division Duplex (TDD) configuration. In some implementations, the primary component carrier is in a first frequency band. Next, at step 1904, second transmission direction at the subframe in a secondary component carrier is determined using a secondary TDD configuration. In some implementations, the second component carrier is in a second frequency band different from the first frequency band. At step 1906, a muted component carrier is selected from component carriers based on interference situation and traffic scenario. Next, at step 1908, transmission and reception on the muted component carrier is muted at the subframe.

A number of implementations of the disclosure have been described. Nevertheless, it will be understood that various modifications may be made without departing from the spirit and scope of the disclosure. Accordingly, other implementations are within the scope of the following claims.

What is claimed is:

1. A method of wireless communications between a wireless communications network and wireless user equipment, comprising:
    transmitting, using a primary time division duplex (TDD) configuration, data on a primary component carrier in a first frequency band;
    transmitting, using a secondary TDD configuration, data on a secondary component carrier, in a secondary frequency band different from the first frequency band;
    receiving, using a supplemental TDD configuration, a Hybrid Automatic Repeat Request (HARD) ACK/NACK for the data transmitted on the second component carrier, wherein the supplemental TDD configuration is determined by combining a plurality of uplink subframes to form a set of uplink subframes, the set of uplink subframes including uplink subframes in the primary TDD configuration and uplink subframes in the secondary TDD configuration; and
    transmitting, using the supplemental TDD configuration, an uplink data transmission on the secondary component carrier.

2. The method of claim 1, further comprising:
    prior to transmitting uplink data transmission on the secondary component carrier, receiving, an uplink grant granting resources for the uplink data transmission.

3. The method of claim 2, wherein the uplink grant is received using the supplemental TDD configuration.

4. The method of claim 1, wherein the supplemental TDD configuration specifies a set of uplink subframes including uplink subframes in the primary TDD configuration and the secondary TDD configuration.

5. The method of claim 1, further comprising retransmitting an uplink data packet on the secondary component carrier at a modified uplink retransmission subframe different from an uplink retransmission subframe specified by the supplemental TDD configuration.

6. The method of claim 5, wherein the modified uplink retransmission subframe is a subframe preceding the uplink retransmission subframe.

7. The method of claim 5, wherein the modified uplink retransmission subframe is a next available uplink subframe not previously scheduled after the uplink retransmission subframe.

8. A user equipment (UE), comprising:
    at least one hardware processor; and
    a non-transitory computer-readable storage medium coupled to the at least one hardware processor and storing programming instructions for execution by the at least one hardware processor, wherein the programming instructions, when executed, cause the at least one hardware processor to perform operations comprising:
        transmitting, using a primary time division duplex (TDD) configuration, data on a primary component carrier in a first frequency band;
        transmitting, using a secondary TDD configuration, data on a secondary component carrier, in a secondary frequency band different from the first frequency band;
        receiving, using a supplemental TDD configuration, a Hybrid Automatic Repeat Request (HARD) ACK/NACK for the data transmitted on the second component carrier, wherein the supplemental TDD configuration is determined by combining a plurality of uplink subframes to form a set of uplink subframes, the set of uplink subframes including uplink subframes in the primary TDD configuration and uplink subframes in the secondary TDD configuration; and
        transmitting, using the supplemental TDD configuration, an uplink data transmission on the secondary component carrier.

9. The UE of claim 8, the operations further comprising:
    prior to transmitting uplink data transmission on the secondary component carrier, receiving, an uplink grant granting resources for the uplink data transmission.

10. The UE of claim 9, wherein the uplink grant is received using the supplemental TDD configuration.

11. The UE of claim 8, wherein the supplemental TDD configuration specifies a set of uplink subframes including uplink subframes in the primary TDD configuration and the secondary TDD configuration.

12. The UE of claim 8, the operations further comprising retransmitting an uplink data packet on the secondary component carrier at a modified uplink retransmission subframe different from an uplink retransmission subframe specified by the supplemental TDD configuration.

13. The UE of claim 12, wherein the modified uplink retransmission subframe is a subframe preceding the uplink retransmission subframe.

14. The UE of claim 12, wherein the modified uplink retransmission subframe is a next available uplink subframe not previously scheduled after the uplink retransmission subframe.

15. A non-transitory computer-readable medium storing instructions which, when executed, cause a computing device to perform operations comprising:
    transmitting, using a primary time division duplex (TDD) configuration, data on a primary component carrier in a first frequency band;
    transmitting, using a secondary TDD configuration, data on a secondary component carrier, in a secondary frequency band different from the first frequency band;
    receiving, using a supplemental TDD configuration, a Hybrid Automatic Repeat Request (HARD) ACK/NACK for the data transmitted on the second component carrier, wherein the supplemental TDD configuration is determined by combining a plurality of uplink subframes to form a set of uplink subframes, the set of uplink subframes including uplink subframes in the primary TDD configuration and uplink subframes in the secondary TDD configuration; and
    transmitting, using the supplemental TDD configuration, an uplink data transmission on the secondary component carrier.

16. The non-transitory computer-readable medium of claim 15, the operations further comprising:

prior to transmitting uplink data transmission on the secondary component carrier, receiving, an uplink grant granting resources for the uplink data transmission.

17. The non-transitory computer-readable medium of claim 16, wherein the uplink grant is received using the supplemental TDD configuration.

18. The non-transitory computer-readable medium of claim 15, wherein the supplemental TDD configuration specifies a set of uplink subframes including uplink subframes in the primary TDD configuration and the secondary TDD configuration.

19. The non-transitory computer-readable medium of claim 15, the operations further comprising retransmitting an uplink data packet on the secondary component carrier at a modified uplink retransmission subframe different from an uplink retransmission subframe specified by the supplemental TDD configuration.

20. The non-transitory computer-readable medium of claim 19, wherein the modified uplink retransmission subframe is a subframe preceding the uplink retransmission subframe.

* * * * *

UNITED STATES PATENT AND TRADEMARK OFFICE
CERTIFICATE OF CORRECTION

PATENT NO. : 10,980,054 B2  
APPLICATION NO. : 16/597767  
DATED : April 13, 2021  
INVENTOR(S) : Yiping Wang, Jun Li and Youn Hyoung Heo Page 1 of 1

It is certified that error appears in the above-identified patent and that said Letters Patent is hereby corrected as shown below:

In the Claims

In Column 15, Line 26, In Claim 1, delete "(HARD)" and insert -- (HARQ) --, therefor.

In Column 16, Line 9 (Approx.), In Claim 8, delete "(HARD)" and insert -- (HARQ) --, therefor.

In Column 16, Line 55, In Claim 15, delete "(HARD)" and insert -- (HARQ) --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*